United States Patent
Matsuura et al.

(10) Patent No.: US 9,719,829 B2
(45) Date of Patent: Aug. 1, 2017

(54) FLUID MEASUREMENT SYSTEM

(75) Inventors: Kazuhiro Matsuura, Kyoto (JP);
Hiroshi Takakura, Kyoto (JP);
Yukimasa Furukawa, Kyoto (JP);
Tadahiro Yasuda, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 395 days.

(21) Appl. No.: 13/278,092

(22) Filed: Oct. 20, 2011

(65) Prior Publication Data
US 2012/0101744 A1    Apr. 26, 2012

(30) Foreign Application Priority Data

Oct. 20, 2010 (JP) ................................ 2010-235249
Nov. 8, 2010 (JP) ................................ 2010-250209

(51) Int. Cl.
*G01F 15/06* (2006.01)
*G01F 15/00* (2006.01)

(52) U.S. Cl.
CPC .......... *G01F 15/068* (2013.01); *G01F 15/005* (2013.01)

(58) Field of Classification Search
CPC ........ G01F 15/005; G01F 15/068; G01F 1/00; G01F 15/06; G01F 15/00; G01F 15/0005
See application file for complete search history.

(56) References Cited

U.S. PATENT DOCUMENTS 4,884,441 A * 12/1989 Lew .................................. 73/195
5,441,076 A * 8/1995 Moriya ................. G05D 7/0635
                                              137/486
5,911,238 A     6/1999 Bump et al.
6,026,352 A *   2/2000 Burns ................. G05B 19/0425
                                              700/1
6,308,553 B1 * 10/2001 Bonne et al. .................. 73/1.35
(Continued)

FOREIGN PATENT DOCUMENTS

CN        1926406 A        3/2007
CN      101839737 A        9/2010
(Continued)

OTHER PUBLICATIONS

Japanese Patent Office, Office Action of Japanese Patent Application No. 2010-250209, Jan. 21, 2014, 4 pages.
(Continued)

*Primary Examiner* — Sujoy Kundu
*Assistant Examiner* — Lisa Peters
(74) *Attorney, Agent, or Firm* — Alleman Hall Creasman & Tuttle LLP (57) ABSTRACT

This invention is to improve procedures of maintenance of a fluid measurement system having a fluid measurement device and a control device. The fluid measurement system has a fluid measurement device and a control device to control the fluid measurement device, and the fluid measurement device comprises a fluid sensor and a related data store part configured to store fluid calculation related data for calculation of one or more fluid parameters with measurement data obtained by the fluid sensor, and the control device obtains the fluid calculation related data from the related data store part and calculates the one or more fluid parameters with the measurement data of the fluid sensor and the fluid calculation related data.

8 Claims, 3 Drawing Sheets

(56) References Cited

U.S. PATENT DOCUMENTS

| | | | |
|---|---|---|---|
| 6,810,308 B2* | 10/2004 | Shajii et al. | 700/282 |
| 7,881,829 B2* | 2/2011 | Yoneda et al. | 700/282 |
| 2007/0079018 A1* | 4/2007 | Day | G06F 13/1642 710/34 |
| 2008/0295892 A1* | 12/2008 | Takahashi et al. | 137/87.03 |
| 2010/0000608 A1* | 1/2010 | Goto | G01F 1/6847 137/2 |
| 2010/0229965 A1 | 9/2010 | Kashima et al. | |

FOREIGN PATENT DOCUMENTS

| | | |
|---|---|---|
| JP | H05134711 A | 6/1993 |
| JP | 10111152 A | 4/1998 |
| JP | 2000018408 A | 1/2000 |
| JP | 2005-531069 A | 10/2005 |
| JP | 2005315713 A | 11/2005 |
| JP | 2006120149 A | 5/2006 |
| JP | 2010231331 A | 10/2010 |
| WO | 04/001516 A1 | 12/2003 |

OTHER PUBLICATIONS

Japanese Patent Office, Office Action issued in Japanese Patent Application No. 2010-250209, Sep. 30, 2014, 4 pages.
State Intellectual Property Office of the People's Republic of China, Office Action Issued in Patent Application No. 201110319279.6, Feb. 3, 2015, 9 pages.
Japanese Patent Office, Office Action Issued in Japanese Patent Application No. 2010-250209, Sep. 1, 2015, 3 pages.
State Intellectual Property Office of the People's Republic of China, Office Action Issued in Chinese Patent Application No. 201110319279.6, Sep. 25, 2015, 17 pages.
Japan Patent Office, Office Action Issued in Application No. 2015-255020, dated Nov. 22, 2016, 2 pages.

\* cited by examiner

FLUID MEASUREMENT SYSTEM

FIELD OF THE ART

This invention relates to a fluid measurement system having a fluid measurement device such as a mass flow controller and a control device to control the fluid measurement device.

BACKGROUND ART

As shown in Japanese Unexamined Patent Application Publication No. 2005-531069, there is a conventional flow rate measurement system comprising one or a plurality of flow rate measurement devices such as one or a plurality of mass flow rate sensors, and a control device that controls these flow rate measurement devices. Correction data for each flow rate measurement device, analytical curve data, and an ID of the flow rate measurement device or a code to operate the flow rate measurement device are stored in a memory arranged for the control device of the flow rate measurement system.

However, with an arrangement that the correction data or the like is stored in the control device, in a case that the flow rate measurement device is exchanged due to malfunction of the flow rate measurement device, the correction data of the exchanged flow rate measurement device has to be newly written in a memory to correspond with the exchanged flow rate measurement device. An operation of exchanging and correcting the flow rate measurement device and an operation of newly writing correction data in the memory have to be conducted when the flow rate measurement device is connected to the control device. In other words, since it is necessary to correct the flow rate measurement device and to write the correction data or the like in the control device at a location where the flow rate measurement system is utilized, such as a manufacturing line, there is a problem that a process of maintenance becomes complicated.

PRIOR ART DOCUMENT

Patent Document

DISCLOSURE OF THE INVENTION

Problems to be Solved by the Invention

The present claimed invention intends to solve all of the problems and a main object of this invention is to make it possible for the control device to automatically obtain the data related to calculation of one or more fluid parameters just by connecting the fluid measurement device to the control device so as to improve the process of maintenance of the fluid measurement system.

Means to Solve the Problems

More specifically, a fluid measurement system in accordance with this invention is a fluid measurement system having a fluid measurement device and a control device configured to control the fluid measurement device, and is characterized by the fluid measurement device comprising a fluid sensor, and having a related data store part configured to store fluid calculation related data for calculation of one or more fluid parameters with measurement data obtained by the fluid sensor, and the control device obtains the fluid calculation related data from the related data store part and calculates the one or more fluid parameters with the measurement data of the fluid sensor and the fluid calculation related data. As the fluid sensors represented are flow rate sensors to measure a flow rate of a fluid, a pressure sensor to measure a pressure of a fluid, a concentration sensor to measure a concentration of a predetermined component in a fluid, and a ratio sensor to measure a mixing ratio of a fluid or the like.

In accordance with this arrangement, it is possible for the control device to automatically obtain the fluid calculation related data intrinsic to the fluid measurement device with which the control device is connected just by connecting the control device with the fluid measurement device. With this arrangement, since a procedure of inputting data can be avoided at the location where the fluid measurement system is utilized, such as a manufacturing line, just by storing the flow rate calculation related data, it is possible to improve procedures of maintenance. In addition, even though there is a necessity of exchanging the control device due to malfunction or the like, since the fluid calculation related data is stored in the fluid measurement device, it is possible to configure the fluid measurement system just by connecting a new control device with the fluid measurement device without a procedure of inputting the fluid calculation related data. Particularly, a measurement error due to an instrumental error of the fluid sensor accounts for a large ratio of the instrumental error of the fluid measurement device, however, since data to correct the instrumental error of the fluid sensor is contained in the fluid calculation related data, a procedure of inputting data for correction of the instrumental error can be avoided at the location where the flow rate measurement system is utilized, such as a manufacturing line, so that procedures of maintenance can be improved.

It is preferable that the fluid measurement device has an AD convertor configured to convert an analog signal output from the fluid sensor into a digital signal, which comprises the measurement data, and the fluid calculation related data includes AD conversion characteristic data showing an AD conversion characteristic of the AD convertor. With this arrangement, it is possible to calculate the flow rate of the fluid with considering a conversion characteristic of the AD convertor arranged for the fluid measurement device so that the fluid can be calculated with high accuracy by correcting the conversion error at a time of AD conversion. In addition, it is possible to lessen an error due to the instrumental error of the AD convertor.

If the control device is configured to directly obtain the digital signal from the AD convertor, there is a problem that a process of the control device or other device is restricted due to a waiting time of the AD conversion. In order to solve this problem, it is preferable that the fluid measurement device has a processor to obtain the digital signal from the AD convertor and to store the obtained digital signal in a memory, and the control device obtains the digital signal converted by the AD convertor through the processor. With this arrangement, it is possible to reduce a processing amount of the control device. Then in case of using a processor having the same performance, a higher speed processing can be performed so that it becomes possible to control a larger number of the fluid control devices.

It is preferable that the fluid sensor is a flow rate sensor, the fluid measurement device is a mass flow controller further comprising a flow rate adjustment valve, and the control device conducts a comparison calculation between a calculated flow rate value and a flow rate set value and controls the flow rate adjustment valve by the use of the calculated result. With a conventional method, in the case that the flow rate measurement device is a mass flow controller, an amount of data to be input to the control device also increases. However, with the present claimed invention, there is no need of inputting the data so that a procedure of maintenance can be further improved.

A fluid measurement device preferably used for the above-mentioned fluid measurement system is characterized by a fluid measurement device connected to a control device and controlled by the control device, and the fluid measurement device comprises a fluid sensor and a related data store part configured to store fluid calculation related data for calculation of one or more fluid parameters with the measurement data obtained by the fluid sensor, wherein the fluid calculation related data is output to the control device from the related data store part and the measurement data of the fluid sensor is output to the control device.

In addition, a program for the flow rate measurement device, preferably for the above-mentioned flow rate measurement system is a fluid measurement program for a fluid measurement device that has a fluid sensor and that is connected to a control device and controlled by the control device, and that is characterized by providing a computer with a function as a related data store part configured to store fluid calculation related data for calculation of a one or more fluid parameters using measurement data obtained by the fluid sensor.

A program used for the control device preferably used for the above-mentioned flow rate measurement system is a fluid measurement device control program configured to control a fluid measurement device having a fluid sensor and a related data store part configured to store fluid calculation related data used for calculation of the one or more fluid parameters using measurement data obtained by the fluid sensor, and that is characterized by providing a computer with a function as a related data obtaining part configured to obtain the fluid calculation related data from the related data store part and a function as a fluid calculation part configured to calculate one or more fluid parameters with the measurement data of the fluid sensor and the fluid calculation related data.

Effect of the Invention

In accordance with the invention having the above-mentioned arrangement, since the data relating to the calculation of the fluid can be obtained automatically just by connecting the fluid measurement device to the control device, it is possible to improve procedures of maintenance of the fluid measurement system.

BEST MODES OF EMBODYING THE INVENTION

One embodiment of a fluid measurement system, in this example a flow rate measurement system, in accordance with this invention will be explained with reference to drawings.

System Configuration

Figure 1:
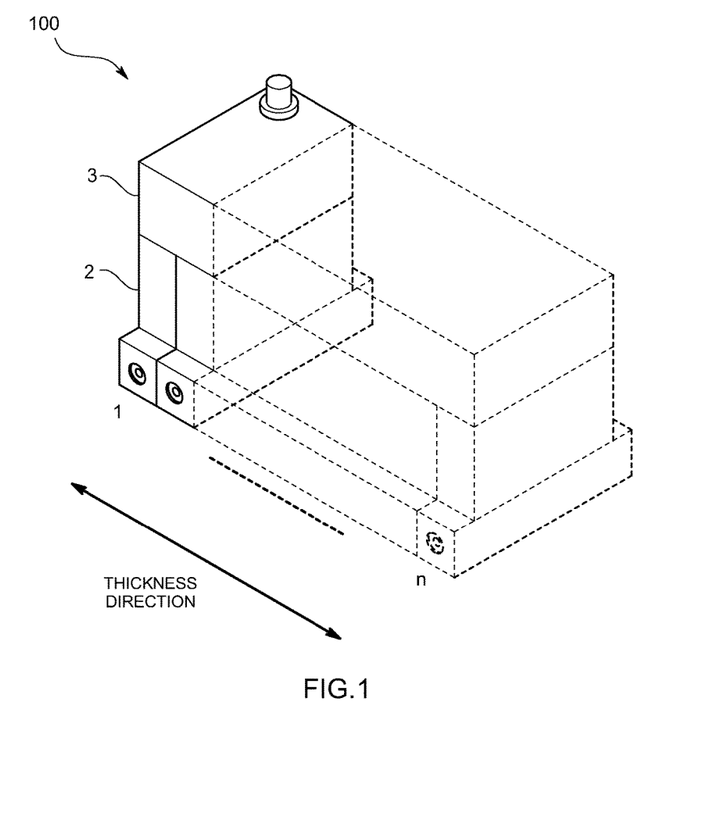
FIG. 1 is a pattern configuration diagram of a fluid measurement system in accordance with one embodiment of this invention.

The flow rate measurement system 100 in accordance with this embodiment is mounted on, for example, a gas panel, and constitutes a part of a material supply line of semiconductor manufacture equipment, and as shown in FIG. 1, comprises multiple flow rate measurement devices 2, and a control device 3 that controls the multiple flow rate measurement devices 2 by sending and receiving data between the flow rate measurement devices 2 and the control device 3. The flow rate measurement system 100 in accordance with this embodiment has an arrangement that the multiple flow rate measurement devices 2 are arranged in parallel in a thickness direction and the control device 3 is arranged above the multiple flow rate measurement devices 2. A total thickness of the multiple flow rate measurement devices 2 is generally the same as a thickness of the control device 3. Two flow rate measurement devices are depicted, however, any number n of flow rate measurement devices may be included. The multiple flow rate measurement devices 2 are connected with the control device 3 by bus connection, and it is configured so that each of the multiple flow rate measurement devices 2 can be exchanged. In addition, a thickness of each flow rate measurement device 2 is configured to be considerably thin. Since there is a demand for saving an area to place the semiconductor manufacturing equipment as much as possible, there is a demand for saving an area to place the flow rate measurement devices by downsizing the flow rate measurement device itself, such as a mass flow controller. As a result of this, since it is possible to lessen a number of components constituting the flow rate measurement devices 2 by communizing parts of the multiple flow rate measurement devices 2 located in the control device 3, the thickness of the flow rate measurement device 2 can be made thin.

Figure 2:
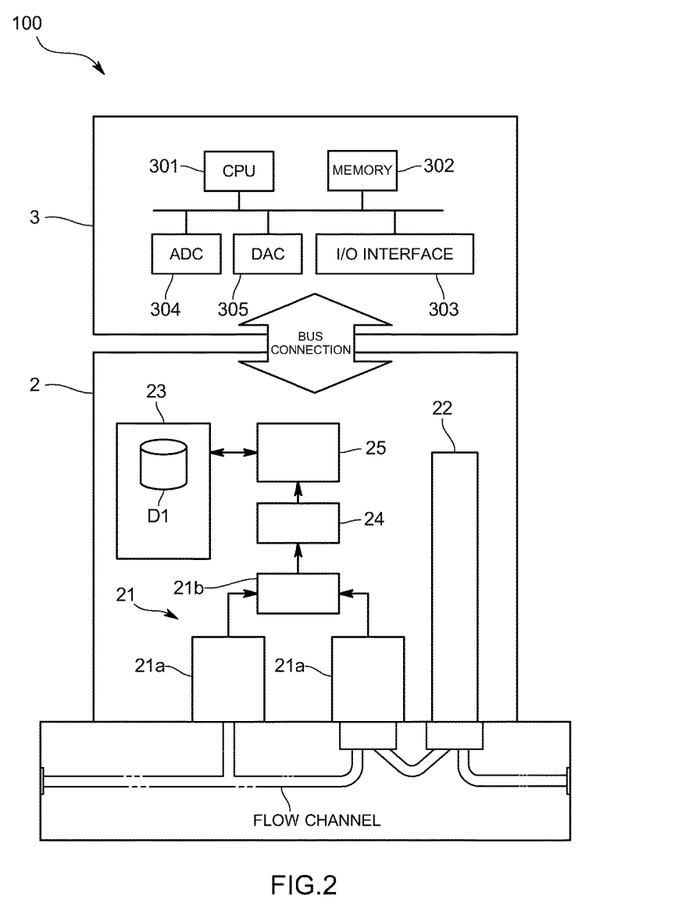
FIG. 2 is a device configuration diagram of a mass flow controller and a control device of this embodiment.

As shown in FIG. 2, the multiple flow rate measurement devices 2 are arranged for multiple flow channels respectively, and each flow rate measurement device 2 controls a mass flow rate of the fluid flowing in each corresponding flow channel. Specifically, in the depicted embodiment, the flow rate measurement device 2 is a mass flow controller (MFC) comprising a differential flow rate sensor 21 to measure a mass flow rate of the fluid flowing in the flow channel, a flow rate adjustment valve 22 to adjust the mass flow rate of the fluid flowing in the flow channel, and a temperature sensor (not shown in drawings) to measure temperature of the fluid. The mass flow controller 2 is housed in a casing different from a casing of the control device 3.

The flow rate sensor 21 has a sensing part 21a to detect an instantaneous flow rate of the fluid as an electric signal, and an internal electric circuit 21b to amplify the electric signal from the sensing part 21a, and outputs a flow rate measurement signal as an analog signal in accordance with the flow rate. The flow rate adjustment valve 22 is configured such that a ratio of valve opening is changed by an actuator comprising piezoelectric elements. The flow rate adjustment valve 22 drives the actuator by being given a signal of the ratio of the valve opening as an electric signal from outside, and adjusts the ratio of the valve opening in accordance with the signal of the ratio of the valve opening so that the flow rate of the fluid is controlled.

In addition, each flow rate measurement device (MFC) 2 comprises a related data store part D1 to store flow rate calculation related data used for calculation of the flow rate using the measurement data obtained by the flow rate sensor 21, an AD convertor 24 to convert the analog signal output by the flow rate sensor 21 into a digital signal as the measurement data, and a processor 25 to obtain the digital signal from the AD convertor 24.

The related data store part D1 comprises a memory 23 (for example, a rewritable ROM such as an EEPROM) arranged on the flow rate measurement device 2. In addition, the processor 25 comprises a PLD (Programmable Logic Device). Then the processor 25 temporarily stores the measurement data obtained from the AD convertor in a memory (for example, a RAM or the like) or in a predetermined area of the memory 23.

The flow rate calculation related data is intrinsic data determined by each mass flow controller 2 and is necessary for calculation of the flow rate measurement value from the measurement data obtained by the mass flow controller 2. Specifically, the flow rate calculation related data includes analytical curve data (sensor output-flow rate value data) showing the flow rate measurement value to the sensor output (measurement data) for each gas type, correction data to correct an instrumental error of the flow rate sensor 21 or other components (for example, a temperature sensor, a restrictor or the like) constituting the mass flow controller 2, conversion characteristic data showing a conversion characteristic of the AD convertor 24, adjustment coefficient data of the Proportional, Integral and Derivative Control (PID) used at a time of calculating the valve opening ratio control signal, and analytical curve data between the actual flow rate and the measurement flow rate and traceability data (e.g., data showing version information of a correction tool) of a product. In addition, the flow rate calculation related data is stored in the related data store part D1 of the mass flow controller 2 by an operator in a stand alone state of the mass flow controller 2 before connecting with the control device 3, for example, at a time of shipping of the mass flow controller 2. Furthermore, the flow rate calculation related data is rewritable if necessary after connecting with the control device 3.

The control device 3, to which multiple mass flow controllers 2 are connected by bus connection, controls the mass flow controllers 2 and calculates the flow rate from the measurement data of each mass flow controller 2 so as to control the flow rate adjustment valve 22 of each mass flow controller 2.

Figure 3:
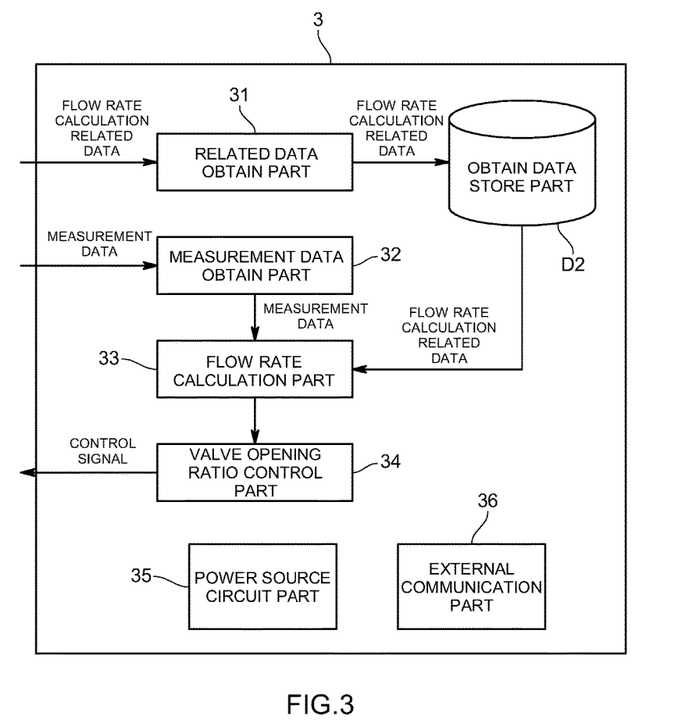
FIG. 3 is a function configuration diagram of the control device of this embodiment.

Specifically, the control device 3 comprises, as shown in FIG. 2, a general purpose or a dedicated computer having a CPU 301, a memory 302, an input/output interface 303, an AD convertor 304, and a DA convertor 305, and is housed in a casing different from a casing of the mass flow controller 2. Then, as shown in FIG. 3, the control device 3 includes a related data obtaining part 31, an obtained data store part D2, a measurement data obtaining part 32, a flow rate calculation part 33, and a valve opening ratio control part 34, by cooperatively operating the CPU 301 or its peripheral devices based on the flow rate measurement program stored in the memory 302. In addition, the control device 3 is also provided with a power source circuit part 35 and an external communication part 36 to communicate with the outside.

Each component will be explained together with a movement of the control device 3 and each of the mass flow controllers 2.

The related data obtaining part 31 verifies a number of the connected mass flow controllers 2 at a time of initializing the control device 3 or at a time when the power is applied to the control device 3. Then the obtained data store part D2 is secured as an area for storing the data obtained from each of the mass flow controllers 2 in the memory 302 (for example, RAM or the like) of the control device 3. The related data obtaining part 31 obtains the flow rate calculation related data stored in the related data store part D1 of each of the connected mass flow controllers 2 and the data necessary for communication with a preceding control device stored in the other memory area and stores the data in the obtained data store part D2.

The processor 25 of the mass flow controller 2 reads in the flow rate calculation related data from the related data store part D1 and transmits the data to the related data obtaining part 31 at a time when the processor 25 receives a read-in command from the related data obtaining part 31. In addition, the processor 25 stores the designated data in a predetermined area of the memory 23, such as the related data store part D1, at a time when the processor 25 receives the write command to the memory 23, such as the related data store part D1 from the control device 3.

Later, the measurement data obtaining part 32 obtains the measurement data at predetermined intervals from the processor 25 of each of the mass flow controllers 2 and reads in the data.

The processor 25 of each of the mass flow controllers 2 outputs an AD conversion command of the AD convertor 24 for each channel (channel of input/output signal) respectively, obtains a digital signal as the measurement data from the AD convertor 24 in conformity to a waiting time of the AD convertor 24, and stores the digital signal in the memory 23 of each mass flow controller 2 or in the memory of the processor 25. At a time when a request for the AD conversion value (measurement data) is received from the measurement data obtaining part 32, the processor 25 returns the measurement data stored in the memory to the measurement data obtaining part 32. Since the measurement data obtaining part 32 of the control device 3 obtains the measurement data stored in the memory from the processor 25 of the mass flow controller 2, it is possible to obtain the measurement data irrespective of the waiting time of the AD convertor 24. With this arrangement, it is possible to reduce an amount to be processed by the CPU 301 of the control device 3. As a result, in a case of using the CPU 301 of the same performance, a higher speed processing can be performed so that it becomes possible to control a larger number of the flow rate measurement devices 2.

The flow rate calculation part 33 calculates the flow rate measurement value by the use of the measurement data obtained by the measurement data obtaining part 32 and the flow rate calculation related data obtained by the flow rate calculation related data obtaining part 31. In addition to calculation of the flow rate measurement value, the flow rate calculation part 33 obtains a detection signal from the temperature sensor arranged inside of the mass flow controller 2 and calculates a temperature of the fluid based on the detection signal.

The valve opening ratio control part 34 compares the flow rate measurement value of each of the mass flow controllers 2 calculated by the flow rate calculation part 33 with the flow rate set value previously set for each of the mass flow controllers 2, and calculates a deviation between the flow rate measurement value and the flow rate set value. The valve opening ratio control part 34 conducts a comparison operation (preferably, PID operation) on the deviation and calculates a feedback control value to the flow rate adjustment valve 22 of each of the mass flow controllers 2. Furthermore, the valve opening ratio control part 34 controls the valve opening ratio of the flow rate adjustment valve 22 by outputting the control signal showing the feedback control value calculated by the valve opening ratio control part 34 to the flow rate adjustment valve 22 of each of the mass flow controllers 2. With this arrangement, the flow rate of the fluid flowing in each flow channel is controlled.

Effect of this Embodiment

In accordance with the flow rate measurement system 100 of this embodiment having the above-mentioned arrangement, it is possible for the control device 3 to automatically obtain the flow channel calculation related data intrinsic to the mass flow controller 2 to which the control device 3 is connected just by connecting the control device 3 and the mass flow controller 2. With this arrangement, since a procedure of inputting data can be avoided on the spot of using the flow rate measurement system 100 such as a manufacturing line just by storing the flow rate calculation related data intrinsic to the mass flow controller 2, it is possible to improve procedures of maintenance. In addition, even though there is a necessity of exchanging the control device 3 due to malfunction or the like, since the flow rate calculation related data is stored in the mass flow controller 2, it is possible to configure the flow rate measurement system 100 just by connecting a new control device 3 with the mass flow controller 2 without a procedure of inputting the flow rate calculation related data. Furthermore, since the control device 3 is provided with the CPU and the mass flow controller 2 is not provided with the CPU, the flow rate measurement system 100 can realize energy saving as a whole. In addition, since a control device such as a CPU is not provided for the mass flow controller 2, it is possible to make the mass flow controller 2 thin. Furthermore, since it is possible to connect multiple mass flow controllers to a single control device 3, the flow rate measurement system 100 can be made compact.

In addition, since the flow rate calculation related data has the AD conversion characteristic data showing the AD conversion characteristic of the AD convertor 24 and the flow rate can be calculated with considering a conversion characteristic intrinsic to the AD convertor 24 arranged for the mass flow controller 2, it is possible to calculate the flow rate with high accuracy by correcting the conversion error at a time of the AD conversion.

Other Modified Embodiment

The present claimed invention is not limited to the above-mentioned embodiment.

For example, in case that a gas type of the fluid flowing in the flow channel is previously specified, the related data obtaining part may be configured to obtain only the related data corresponding to the specified gas type. With this arrangement, since there is no need to obtain the related data unnecessary for calculation of the flow rate, it is possible to utilize the memory of the control device effectively.

In addition, the control device is connected to multiple mass flow controllers in the above-mentioned embodiment; however, one control device may be connected to a single mass flow controller so as to be correspondent one-on-one.

Furthermore, the flow rate measurement system of the above-mentioned embodiment functions as a flow rate control system to which the mass flow controller is connected, however, the flow rate measurement system may be applied to a system in which another flow rate measurement device such as a mass flow meter or the like is connected.

The processor loaded on the mass flow controller of the above-mentioned embodiment may use a processing device such as a PLD, a CPU, an MPU or the like.

In addition, the flow rate sensor of the mass flow controller of the above-mentioned embodiment is of the differential type; however, it may be of other thermal type or of a pressure type using a sonic nozzle.

Furthermore, the fluid sensor is the flow rate measurement device as being the flow rate sensor in the above-mentioned embodiment; however, another flow rate sensor may be a pressure sensor, a concentration sensor or a ratio sensor that measures a physical value of a fluid.

Computer readable storage media may be provided that include programs comprised of stored instructions, which upon execution by the processors of devices described herein, cause the processor to implement the various functions and processes described herein. The computer-readable storage media are physical devices that may take the form of CDs, DVDs, HD-DVDs, Blu-Ray Discs, EEPROMs, and/or FLASH memory, among others. Thus, the devices described above may be provided with appropriate drives or readers to read computer readable storage media of these formats. It will be appreciated that the computer readable storage media are non-volatile storage media and thus instructions may be stored on the computer readable storage media in a non-transitory manner. These instructions may be read from the computer readable storage media and stored on mass storage of the devices described above, to be implemented by the processor using portions of memory.

Thus, for example, computer readable storage media may be provided, including stored instructions of a fluid measurement program, which upon execution by a processor of a fluid measurement device, causes the fluid measurement device to: receive as input measurement data from a fluid sensor of the fluid measurement device; determine fluid calculation related data for calculation of one or more fluid parameters; store, in a related data store part of the fluid measurement device, the fluid calculation related data with the measurement data obtained by the fluid sensor; and output the fluid calculation related data and the measurement data to a control program of a control device.

Alternatively or in addition, the same or different computer readable storage media may be provided including stored instructions of a control program, which upon execution by a processor of a control device, causes the control device to: obtain fluid calculation related data from a related data store part of a fluid measurement device; obtain measurement data from a fluid sensor of the fluid measurement device; and calculate one or more fluid parameters based on the obtained measurement data and fluid calculation related data.

The term "program" as used herein to refers to software that performs one or more particular functions when executed by a processor of a device. These terms are meant to encompass individual or groups of executable files, data files, libraries, drivers, scripts, and database records, for example. The embodiments described herein show one example organization of such programs. However, it should be appreciated that the functions described herein may be accomplished by differently organized software components.

In addition, it is a matter of course that the present claimed invention is not limited to the above-mentioned embodiment, and may be variously modified without departing from a spirit of the invention.

REFERENCE CHARACTER LIST

100 . . . flow rate measurement system
2 . . . mass flow controller (flow rate measurement device)

21 . . . flow rate sensor
22 . . . flow rate adjustment valve
D1 . . . related data store part
24 . . . AD convertor
25 . . . processor
3 . . . control device

The invention claimed is:

1. A fluid measurement system comprising:
a plurality of flow rate fluid measurement devices, each device comprising:
a fluid sensor configured to obtain measurement data,
a related data store part configured to store fluid calculation related data, which is preset data specifically adapted for use with measurement data obtained by the fluid sensor, and
a first casing that houses the fluid sensor and the related data store part, the first casing having a length in a thickness direction; and
a control device comprising a CPU, a related data obtaining part, and a second casing housing the CPU and the related data obtaining part, the control device being provided separately from the fluid measurement devices and configured to control the fluid measurement devices, the second casing having a length in the thickness direction, wherein
the related data obtaining part is configured to obtain the fluid calculation related data from the related data store part,
the CPU is configured to calculate one or more fluid parameters with the measurement data obtained by the fluid sensor and the fluid calculation related data, and
the second casing is provided separately from the first casings of the plurality of fluid measurement devices and configured to be stacked on top of each of the first casings to adjoin the first casings in a vertical direction perpendicular to the thickness direction,
the first casings of the plurality of flow rate fluid measurement devices are configured to be stacked side-by-side in the thickness direction, and
a combined length of the first casings, comprising a combined sum of the lengths in the thickness direction of the first casings that are stacked side-by-side, is equal to the length in the thickness direction of the second casing stacked on top of each of the first casings.

2. The fluid measurement system described in claim 1, wherein
the fluid measurement device has an AD convertor configured to convert an analog signal output from the fluid sensor into a digital signal which comprises the measurement data; and
the fluid calculation related data includes AD conversion characteristic data showing an AD conversion characteristic of the AD convertor.

3. The fluid measurement system described in claim 2, wherein
the fluid measurement device has a processor configured to obtain the digital signal from the AD convertor and configured to store the obtained digital signal in a memory; and
the control device obtains the digital signal converted by the AD convertor through the processor.

4. The fluid measurement system described in claim 1, wherein
the fluid sensor is a flow rate sensor;
the fluid measurement device is a mass flow controller further comprising a flow rate adjustment valve; and
the control device conducts a comparison calculation between a calculated flow rate value and a flow rate set value and controls the flow rate adjustment valve based on the comparison calculation.

5. The fluid measurement system described in claim 1, wherein
the fluid calculation related data comprises at least one calibration data which is analytical curve data correlating flow rates to measurement data for a plurality of conditions, calibration data correcting instrumental errors in the fluid sensor or control device, or adjustment coefficient data correlating flow rates to opening and closing timings.

6. The fluid measurement system described in claim 1, wherein
each of the plurality of the first casings has a flat top surface provided on a common plane; and
the second casing is provided above all of the flat top surfaces of the first casings.

7. Non-transitory computer readable storage media including stored instructions of a control program, which upon execution by a processor of a control device provided separately from a plurality of flow rate fluid measurement devices, causes the control device to:
via a fluid sensor, obtain measurement data;
via a related data obtaining part, obtain fluid calculation related data, which is preset data specifically adapted for use with measurement data obtained by the fluid sensor, from a related data store part within each fluid measurement device;
calculate, via the processor, one or more fluid parameters with the measurement data obtained by the fluid sensor and the fluid calculation related data; and
control the fluid measurement device, wherein
the fluid measurement device comprises the fluid sensor, the related data store part, and a first casing that houses the fluid sensor and the related data store part, the first casing having a length in a thickness direction;
a second casing, which is provided separately from the first casings of the plurality of fluid measurement devices, houses the related data obtaining part and the processor of the control device, the second casing having a length in the thickness direction;
the second casing is configured to be stacked on top of each of the first casings to adjoin the first casings in a vertical direction perpendicular to the thickness direction;
the first casings of the plurality of flow rate fluid measurement devices are configured to be stacked side-by-side in the thickness direction; and
a combined length of the first casings, comprising a combined sum of the lengths in the thickness direction of the first casings that are stacked side-by-side, is equal to the length in the thickness direction of the second casing stacked on top of each of the first casings.

8. A control device, provided separately from a fluid measurement device, the control device configured to control a plurality of flow rate fluid measurement devices, each device comprising a fluid sensor and at least two related data store parts configured to store flow rate calculation related data, which is preset data specifically adapted for use with measurement data obtained by the fluid sensor;
wherein for each of the plurality of flow rate fluid measurement devices, a first casing houses the fluid sensor and the related data store part, the first casing having a length in a thickness direction;

wherein the control device comprises a related data obtaining part configured to obtain the fluid calculation related data from the related data store part; and a CPU configured to calculate one or more fluid parameters with the measurement data obtained by the fluid sensor and the fluid calculation related data, wherein a second casing, which is provided separately from the first casing, houses the related data obtaining part and the processor of the control device, the second casing having a length in the thickness direction, the second casing is configured to be stacked on top of each of the first casings to adjoin the first casings in a vertical direction perpendicular to the thickness direction, the first casings of the plurality of flow rate fluid measurement devices are configured to be stacked side-by-side in the thickness direction, and a combined length of the first casings, comprising a combined sum of the lengths in the thickness direction of the first casings that are stacked side-by-side, is equal to the length in the thickness direction of the second casing stacked on top of each of the first casings.

\* \* \* \* \*